(12) United States Patent
Sinn et al.

(10) Patent No.: US 12,032,640 B2
(45) Date of Patent: Jul. 9, 2024

(54) AUTOMATED CONTENT SELECTION BASED ON MULTIPLE SURFACE INPUTS, BEHAVIOR AND MACHINE LEARNING

(71) Applicant: ADOBE INC., San Jose, CA (US)

(72) Inventors: Richard Pong Nam Sinn, Milpitas, CA (US); Allan Morgan Young, Santa Rosa, CA (US)

(73) Assignee: ADOBE INC., San Jose, CA (US)

( * ) Notice: Subject to any disclaimer, the term of this patent is extended or adjusted under 35 U.S.C. 154(b) by 205 days.

(21) Appl. No.: 17/489,865

(22) Filed: Sep. 30, 2021

(65) Prior Publication Data
US 2023/0098882 A1 Mar. 30, 2023

(51) Int. Cl.
| | |
|---|---|
| G06F 16/90 | (2019.01) |
| G06F 16/9035 | (2019.01) |
| G06F 16/904 | (2019.01) |
| G06F 16/907 | (2019.01) |
| G06F 16/9535 | (2019.01) |
| G06F 16/9538 | (2019.01) |
| G06N 20/00 | (2019.01) |

(52) U.S. Cl.
CPC ...... *G06F 16/9535* (2019.01); *G06F 16/9035* (2019.01); *G06F 16/904* (2019.01); *G06F 16/907* (2019.01); *G06F 16/9538* (2019.01); *G06N 20/00* (2019.01)

(58) Field of Classification Search
CPC ............ G06F 16/9535; G06F 16/9035; G06F 16/904; G06F 16/907; G06F 16/9538
See application file for complete search history.

(56) References Cited

U.S. PATENT DOCUMENTS

| | | | |
|---|---|---|---|
| 9,116,995 B2 * | 8/2015 | Koperski ............ | G06F 16/3334 |
| 2019/0332650 A1 * | 10/2019 | Alon ................... | G06Q 30/0202 |
| 2020/0133641 A1 * | 4/2020 | Sinn ....................... | G06N 20/20 |
| 2021/0110475 A1 * | 4/2021 | Singh ................... | G06F 40/205 |

* cited by examiner

*Primary Examiner* — Kristopher Andersen
(74) *Attorney, Agent, or Firm* — F. CHAU & ASSOCIATES, LLC

(57) ABSTRACT

Systems and methods for content management are described. One or more embodiments of the present disclosure order content items based on a selection rule, select a rule-based content item based on the ordering, cluster the content items using an unsupervised learning algorithm to obtain a plurality of content groups, select a custom content item related to the rule-based content item based on the content groups, and display the rule-based content item and the custom content item to a user.

20 Claims, 12 Drawing Sheets

FIG. 3

AUTOMATED CONTENT SELECTION BASED ON MULTIPLE SURFACE INPUTS, BEHAVIOR AND MACHINE LEARNING

BACKGROUND

The following relates generally to content management, and more specifically to content management using machine learning.

Content management systems use computers to collect, retrieve, deliver, and transmit information of any form. Content management techniques can be used for search, refinement, and recommendation of content. For example, a computer may be programmed to perform content search on a database and retrieve relevant results based on user preferences. Content management software can include customizable rules for searching in a database and rules for filtering the search results, where the filtered results are transmitted to users.

Conventional content management often recommend content items that are not relevant or diverse. For example, users of two different software applications may be presented the same article recommendations in spaces reserved for each platform. Additionally, generic recommendations (i.e., not customized based on user preferences) do not increase subsequent user interaction with the software application. Furthermore, conventional content management systems are unable to provide diverse content for recommendations. Therefore, there is a need in the art for an improved content management system that can select content for display using a combination of manual rules and unsupervised learning.

SUMMARY

The present disclosure describes systems and methods for content management. Some embodiments of the present disclosure include a content management apparatus that selects rule-based content items and custom content items using machine learning techniques. Additionally or alternatively, the content management apparatus can recommend content items (e.g., articles) to a user using a combination of manual rules and unsupervised learning to select diverse and relevant content for display on a website page. User engagement with one or more software applications from multiple surfaces (e.g., website, desktop, mobile device) can be considered when generating the diverse content. In some examples, the unsupervised learning includes a latent Dirichlet allocation (LDA) clustering algorithm.

A method, apparatus, and non-transitory computer readable medium for content management are described. One or more embodiments of the method, apparatus, and non-transitory computer readable medium include ordering content items based on a selection rule, selecting a rule-based content item based on the ordering, clustering the content items using an unsupervised learning algorithm to obtain a plurality of content groups, selecting a custom content item related to the rule-based content item based on the content groups, and displaying the rule-based content item and the custom content item to a user.

A method, apparatus, and non-transitory computer readable medium for training an unsupervised model are described. One or more embodiments of the method, apparatus, and non-transitory computer readable medium include ordering content items based on a selection rule, selecting a rule-based content item based on the ordering, identifying a pre-determined set of topics, identifying key words from each of the content items, clustering the content items based on the key words using an unsupervised learning model to obtain a plurality of content groups corresponding to the pre-determined set of topics, and selecting a custom content item having a same topic as the rule-based content item based on the clustering.

An apparatus and method for content management are described. One or more embodiments of the apparatus and method include a rule-based content component configured to order content items based on a selection rule and to select a rule-based content item based on the ordering, a clustering component configured to cluster the content items using an unsupervised learning algorithm to obtain a plurality of content groups, a custom content component configured to select a custom content item related to the rule-based content item based on the plurality of content groups, and a user interface configured to display the rule-based content item and the custom content item to a user.

BRIEF DESCRIPTION OF THE DRAWINGS

FIG. 3 shows an example of a user interface of a content management system according to aspects of the present disclosure.

DETAILED DESCRIPTION

Figure 1:
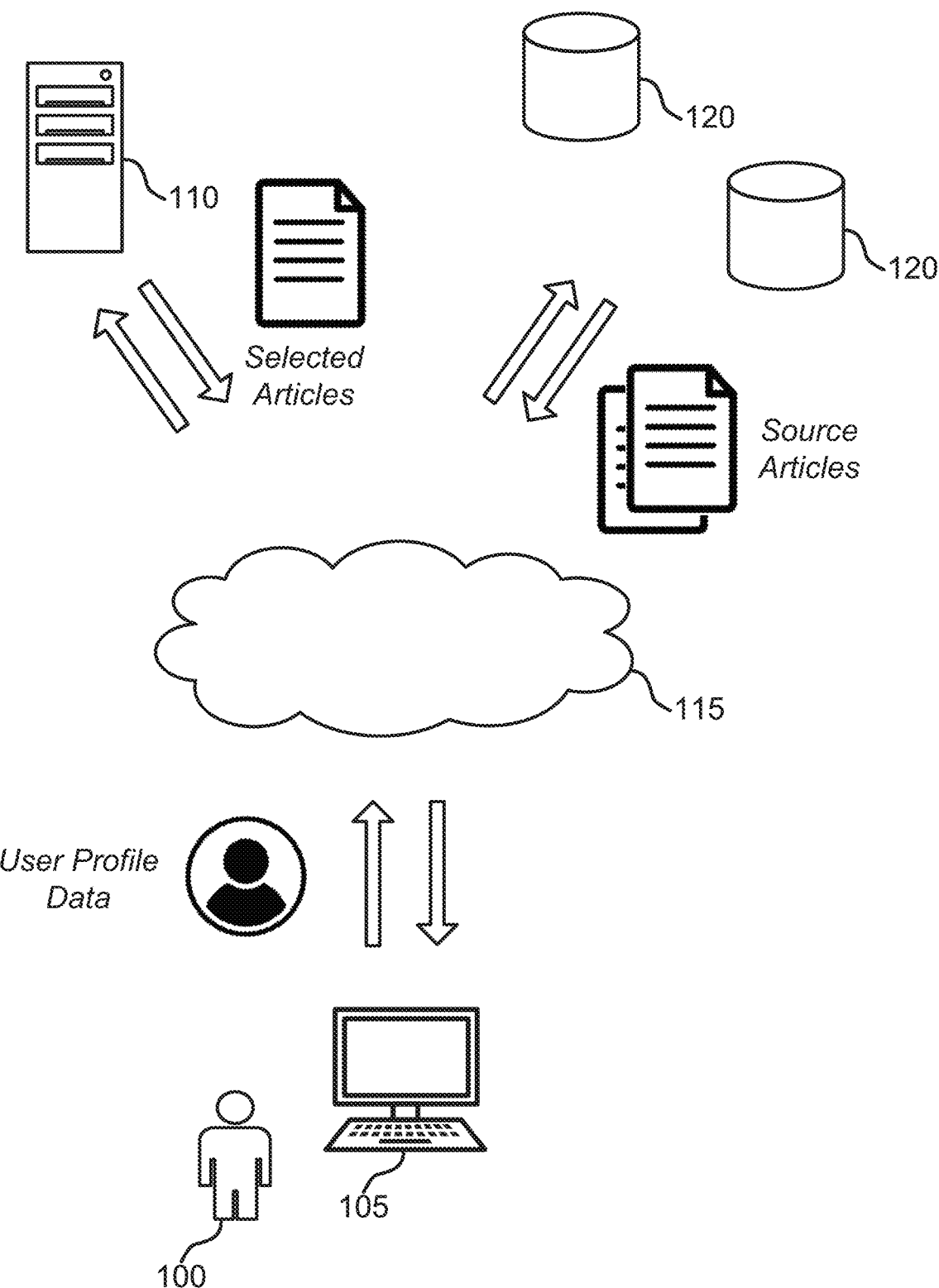
FIG. 1 shows an example of a content management system according to aspects of the present disclosure.

The present disclosure describes systems and methods for content management. Some embodiments of the present disclosure include a content management apparatus configured to select rule-based content items and custom content items using machine learning. In some cases, the content management apparatus recommends content items (e.g., articles) using a combination of manual rules and unsupervised learning methods to select diverse and relevant content for display on a website page. User engagement with one or more software applications from multiple surfaces (e.g., website, desktop, mobile device) are considered when generating the diverse content. In some examples, the unsupervised learning methods includes a latent Dirichlet allocation (LDA) clustering algorithm.

Conventional content management systems filter a list of content search results to obtain a subset for recommendation (e.g., filter movies in a database that are more than 5 years old). Alternatively, machine learning models can be used to collect data relating to user interactions and model user behavior. Trained models can be used to predict items that users are likely to interact with. For example, sequential recommendation systems provide item recommendations to users by modeling the user's sequential interactions (e.g., "clicks chain"). However, conventional content management systems are unable to provide diverse content for recommendations on a website page. For example, sequential recommendation systems can continue to provide similar recommendations to a user. These recommendations can maximize user interaction in the short term, but if they lack diversity users will eventually lose interest and leave a platform or a software application.

Embodiments of the present disclosure include a content management apparatus that selects diverse and relevant content for display on a website page using a combination of manual rules and unsupervised learning. In some examples, the unsupervised learning includes a latent Dirichlet allocation (LDA) clustering algorithm, a latent semantic analysis (LSA) algorithm, a probabilistic latent semantic analysis (PLSA) algorithm, or an Lda2vec algorithm. As a result, users receive diverse content that can range across multiple topics or different software applications (e.g., Adobe® Creative Cloud, Illustrator). User data such as subscription data and user interactions (e.g., clicks, actions and download) across the multiple software applications (or across multiple surfaces such as website, desktop, mobile device, etc.) may be taken into account when retrieving diverse content for display on a website page.

By performing the unconventional step of ordering content items based on both selection rules and machine learning, embodiments of the present disclosure selectively filter and display content that can keep users actively engaged over a long period of time. In some examples, the content management apparatus clusters the content items using an unsupervised learning algorithm. For example, the content management apparatus selects a custom content item related to the rule-based content item and displays the rule-based content item and the custom content item to a user. In some examples, a set of rule-based content items are displayed in a first section of a website page while another set of custom content items are displayed in a second section of the website page.

Embodiments of the present disclosure may be used in the context of a content management system (e.g., a software system that manages the presentation of content for a webpage). For example, a content management system based on the present disclosure may be used to retrieve relevant and diverse content items for users. An example application is provided with reference to FIGS. 1-3. Details regarding the architecture of an example content management apparatus are provided with reference to FIGS. 4-5. Examples of a process for training an unsupervised model are provided with reference to FIGS. 9-12.

Content Management System

FIG. 1 shows an example of a content management system according to aspects of the present disclosure. The example shown includes user 100, user device 105, content management apparatus 110, cloud 115, and database 120.

In the example of FIG. 1, user 100 may provide user profile data. For example, a software or application implemented on user device 105 collects user information through questionnaires. The collected user information forms a new user journey profile. Content management apparatus 110 receives a set of documents from database 120 associated with different source websites. The set of documents include statements relevant to the topic. The user device 105 transmits the user profile data to the content management apparatus 110.

The user 100 communicates with the content management apparatus 110 via the user device 105 and the cloud 115. For example, user 100 uses a publishing software application (e.g., Adobe® InDesign). User 100 may be asked questions related to understanding or experience with the publishing application. User 100 may be interested in receiving content items that are relevant to the publishing software application. User 100 may also be interested in receiving diverse content items (e.g., articles or tutorials demonstrating other software applications). In some examples, the user device 105 communicates with the content management apparatus 110 via the cloud 115. In some embodiments, the content management apparatus 110 selects content for a webpage visited by the user 100.

Accordingly, content management apparatus 110 orders content items based on a selection rule. Content management apparatus 110 selects a rule-based content item based on the ordering. Content management apparatus 110 clusters the content items using an unsupervised learning algorithm to obtain a set of content groups. Content management apparatus 110 selects a custom content item related to the rule-based content item based on the content groups. Additionally, content management apparatus 110 displays the rule-based content item and the custom content item to the user 100.

In some embodiments, content management apparatus 110 may match the user identifier to the user profile. For example, the system may determine the user identifier matches a user profile provided by a user 100 or stored in a database associated with a software application. The database may provide metadata of the user profile such as media content preferences or software subscription data. In some examples, the content management apparatus 110 obtains a user identifier and user profile data from a user device 105. In some embodiments, the matching of the user profile may include communicating with remote servers.

In some embodiments, the user device 105 includes a user interface so that a user 100 can set up or configure user profile data via the user interface. A user interface may enable the user 100 to interact with a device. In some embodiments, the user interface may include an audio device, such as an external speaker system, an external display device such as a display screen, or an input device (e.g., remote control device interfaced with the user interface directly or through an IO controller module). In some cases, a user interface may include a graphical user interface (GUI) such as a web browser.

The user device 105 may be a personal computer, laptop computer, mainframe computer, palmtop computer, personal assistant, mobile device, or any other suitable processing apparatus. In some examples, the user device 105 includes software that incorporates a content management application. The content management application may either include or communicate with the content management apparatus 110. In some cases, content management apparatus 110 may be implemented on the user device 105.

Content management apparatus 110 includes a computer implemented system comprising a rule-based content component, a clustering component, a custom content component, and a user interface. The system orders content items based on a selection rule. The system selects a rule-based content item based on the ordering. The system clusters the content items using an unsupervised learning algorithm to obtain a set of content groups. The system selects a custom content item related to the rule-based content item based on the content groups. The system displays the rule-based content item and the custom content item to a user.

Content management apparatus 110 may also include a processor unit, a memory unit, and a training component. Additionally, content management apparatus 110 can communicate with the database 120 via the cloud 115. Further detail regarding the architecture of content management apparatus 110 is provided with reference to FIGS. 4-5. Further detail regarding a process for content management is provided with reference to FIGS. 6-8. Further detail regarding an unsupervised model is provided with reference to FIGS. 9-12.

In some cases, content management apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data (e.g., documents). For example, a database 120 stores data or documents in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
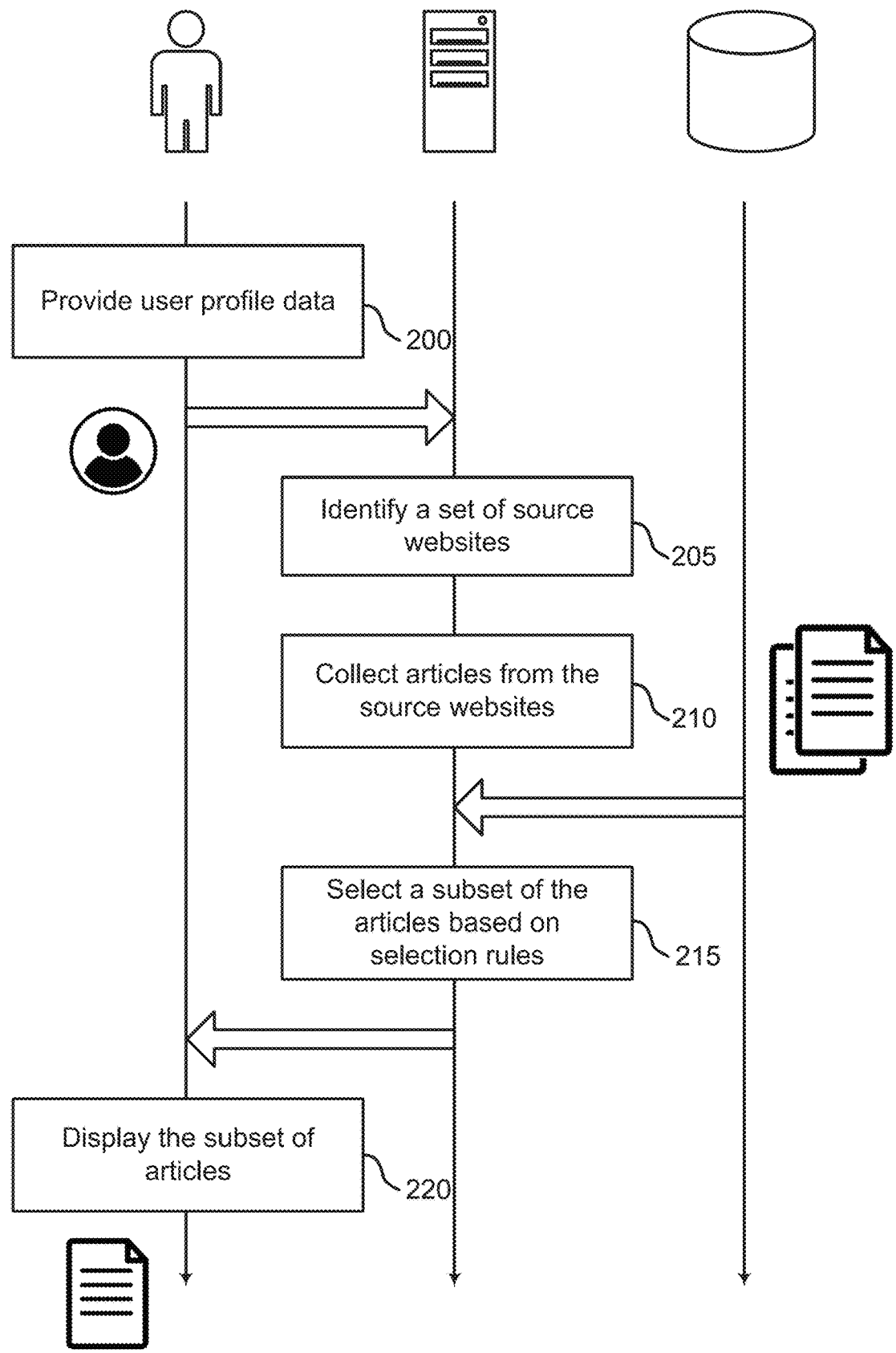
FIG. 2 shows an example of a process for content management according to aspects of the present disclosure.

FIG. 2 shows an example of a process for content management according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user provides user profile data. In some cases, the operations of this step refer to, or may be performed by, a user as described with reference to FIG. 1. The user profile may also be referred to as a new user journey (NUJ) profile. A content management system may include software application to collect user information through questionnaires. Such user information or user preferences form the NUJ profile.

In some examples, an Adobe® creative cloud (CC) desktop application may collect input from users. If a user first signs up on Adobe® Illustrator or the user downloads the CC desktop application, the system creates a profile of the user (i.e., NUJ profile). In some examples, if a user uses a publishing software application (e.g., Adobe® InDesign), the software application displays a questionnaire to collect user responses. For example, the software application may ask if the user wants to print a design, perform digital design, etc. Similarly, a user may be asked questions related to understanding or experience with a publishing application (e.g., Adobe® InDesign). As a result, the user may set initial preferences for the publishing application (e.g., InDesign) where the user preferences may be adjusted in future.

In some examples, if a user clicks an icon in Adobe® CC desktop, the software application collects the information stored in the NUJ profile. Additionally, a user may download an application or read articles or tutorials about an application. As a user gains experience through performing more actions in an application, corresponding NUJ profile is automatically updated.

At operation 205, the system identifies a set of source websites or databases. In some cases, the operations of this step refer to, or may be performed by, a database (or database management software) as described with reference to FIG. 1. As in FIG. 1, the set of source websites or databases are represented by different database icons.

At operation 210, the system collects articles from the source websites. In some cases, the operations of this step refer to, or may be performed by, a content management apparatus as described with reference to FIG. 1. For example, the system collects a first source article from a first source website and collects a second source article from a second source website. The first source website and the second source website have different domain names and/or server addresses.

At operation 215, the system selects a subset of the articles based on selection rules. In some cases, the operations of this step refer to, or may be performed by, a content management apparatus as described with reference to FIG. 1. The selection rules include latest publish date, promoted date range of the articles, paid subscription rule, and user locations. Embodiments of the present disclosure are not limited to these selection rules. The system selects the subset of the articles based on the selection rules and services input collected from the user (see operation 200).

At operation 220, the system displays the subset of articles to the user. In some cases, the operations of this step refer to, or may be performed by, a user device as described with reference to FIG. 1. The subset of articles is more relevant to the user interest following the selection rules and user input. In some examples, the system includes an unsupervised learning model which is applied to one of the recommended datasets and generates the remaining recommendations. In some examples, the system displays the subset of articles in two sections on a user interface or a website application. A first section includes a set of rule-based content items. A second section includes a set of custom content items based on clustering.

Figure 3:
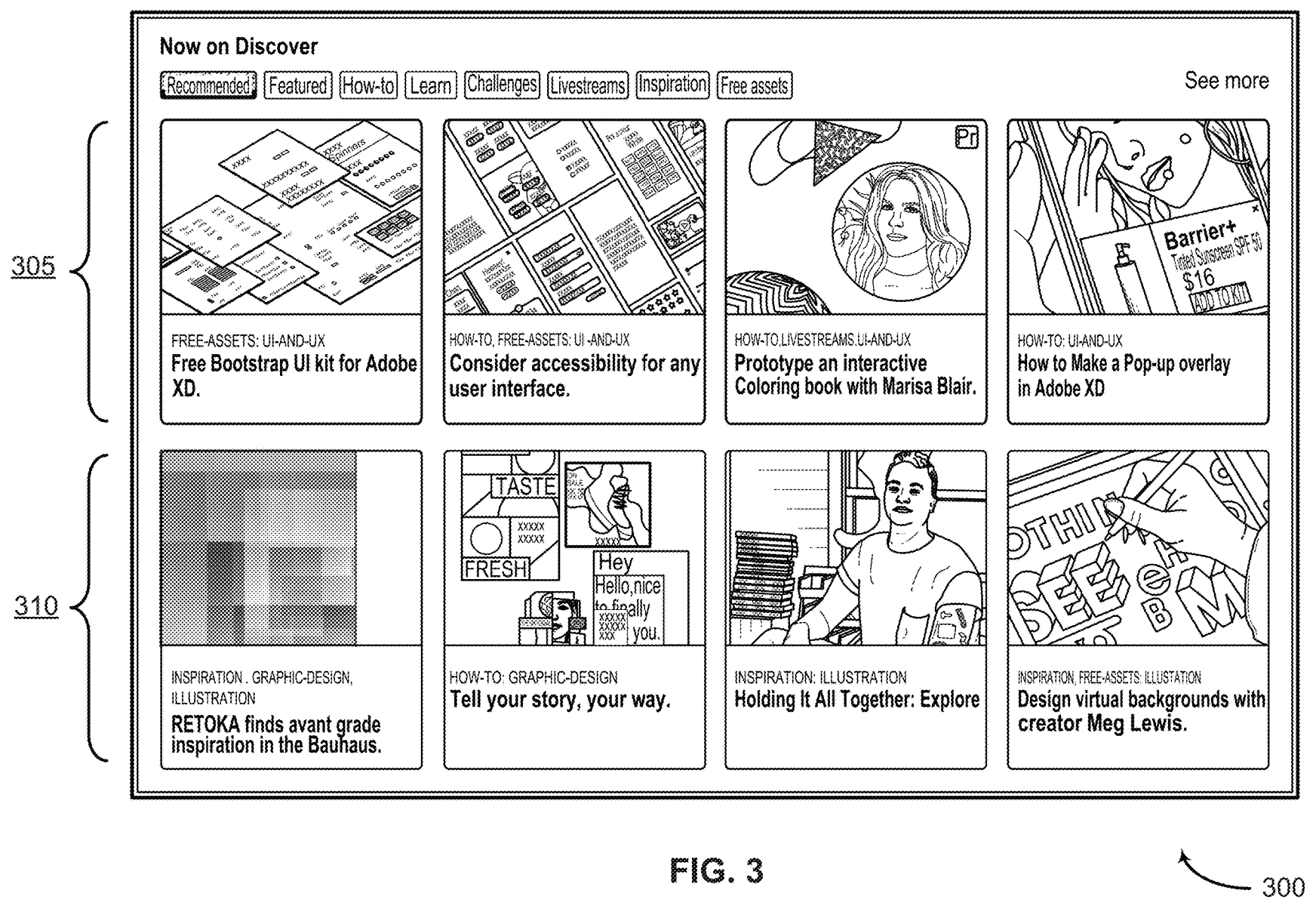

FIG. 3 shows an example of a user interface of a content management system according to aspects of the present disclosure. The example shown includes user interface 300, rule-based content 305, and custom content 310.

In an embodiment, the content management system includes a mixed rule based and machine learning based recommendation system. The content management system incorporates multiple inputs from multiple interconnected services. Therefore, the recommendations displayed in a website application are customized and show increased diversity in content. As a result, user engagement is improved.

According to some embodiments, user interface 300 displays the rule-based content 305 item and the custom content 310 item to a user. In some examples, user interface 300 displays the set of rule-based content 305 items in a first row. In some examples, user interface 300 displays the set of custom content 310 items in a second row. User interface 300 is an example of, or includes aspects of, the corresponding element described with reference to FIGS. 4 and 5.

According to an embodiment, the content management system combines machine learning with manual rules for content recommendation (e.g., articles). Machine learning algorithms can generate additional diverse recommendations and may be applied to different online platforms. For example, different article recommendations are made when a user uses different Adobe® services. A rule-based system may be used to select at least a portion of the recommendations (e.g., articles in the first row). Next, an unsupervised learning method is applied on one of the recommended datasets which generate additional recommendations (e.g., articles for the second row).

System Architecture

Figure 4:
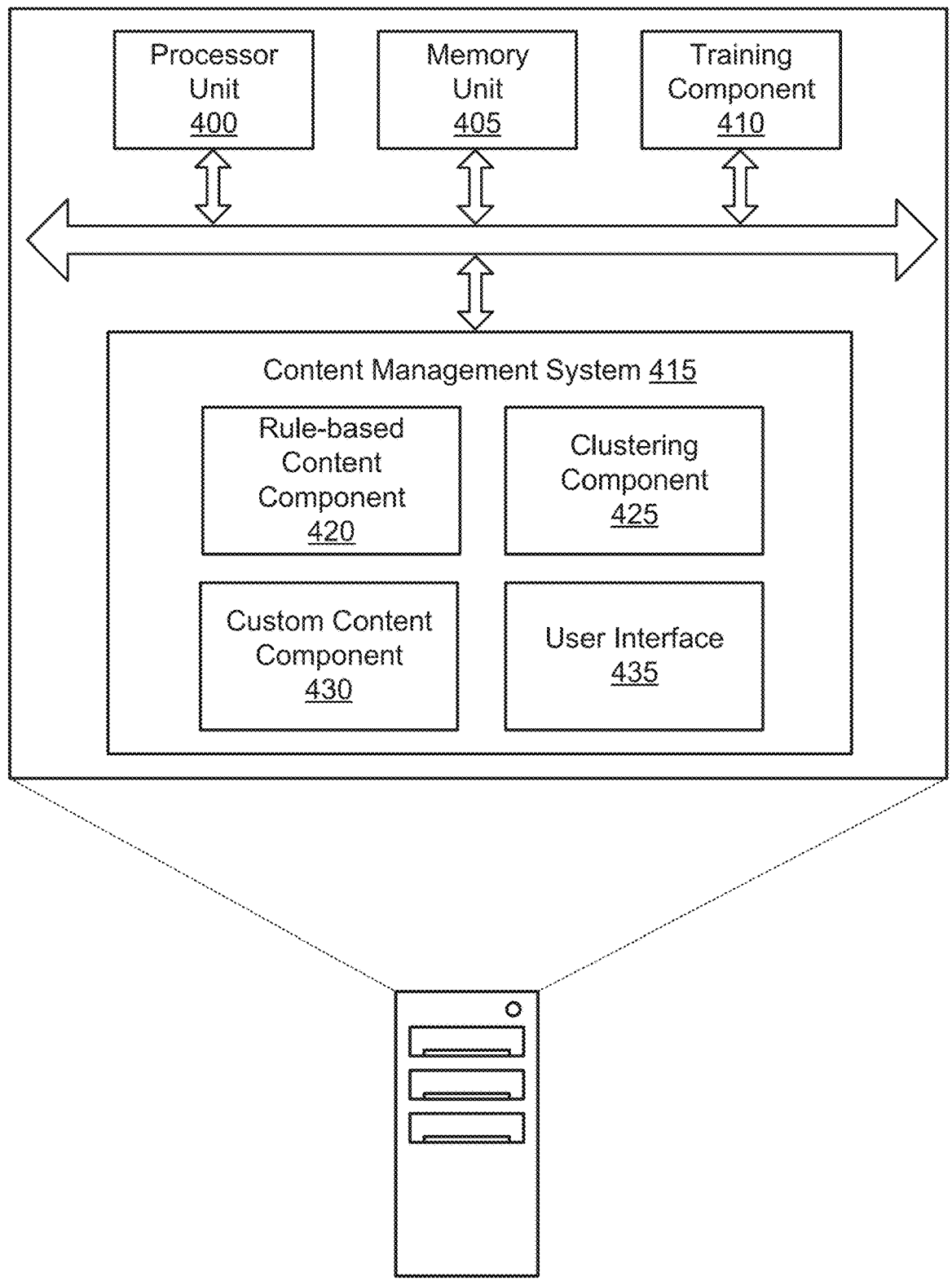
FIG. 4 shows an example of a content management system according to aspects of the present disclosure.
Figure 5:
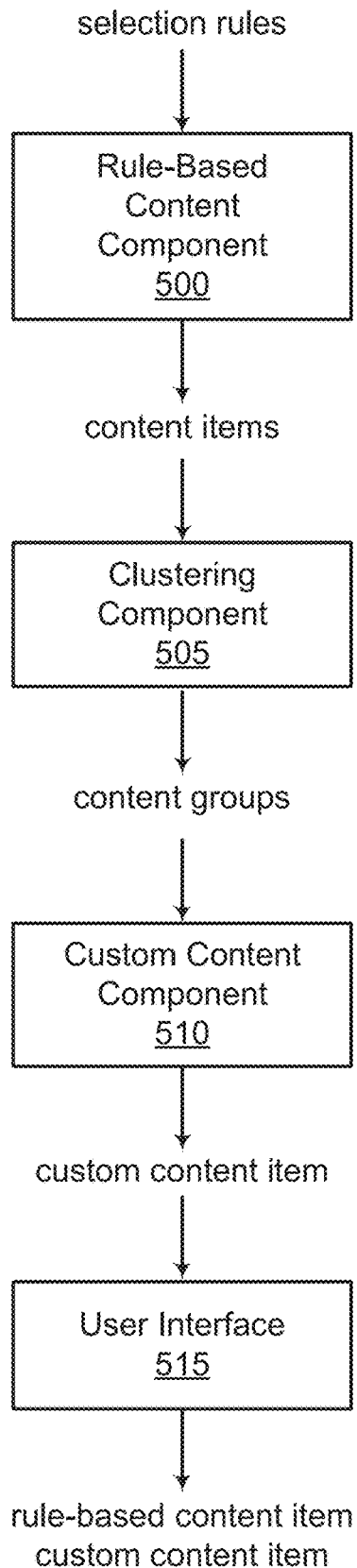
FIG. 5 shows an example of a content management diagram according to aspects of the present disclosure.

In FIGS. 4-5, an apparatus and method for content management are described. One or more embodiments of the apparatus and method include a rule-based content component configured to order content items based on a selection rule and to select a rule-based content item based on the ordering, a clustering component configured to cluster the content items using an unsupervised learning algorithm to obtain a plurality of content groups, a custom content component configured to select a custom content item related to the rule-based content item based on the plurality of content groups, and a user interface configured to display the rule-based content item and the custom content item to a user.

In some examples, the rule-based content component is configured to identify a plurality of selection rules, wherein the content items are ordered based on the selection rules.

In some examples, the clustering component is configured to identify key words from each of the content items, wherein the content items are clustered based on the key words, and identify a pre-determined set of topics, wherein the plurality of content groups correspond to the set of topics.

In some examples, the clustering component is configured to identify a content group corresponding to the rule-based content item, wherein the custom content item is selected from the content group.

In some examples, the rule-based content component is configured to select a plurality of rule-based content items based on the selection rule, and the custom content component is configured to select a plurality of custom content items based on the clustering.

Some examples of the apparatus and method further include a user interface is configured to display the plurality of rule-based content items in a first row, and display the plurality of custom content items in a second row.

FIG. 4 shows an example of a content management system according to aspects of the present disclosure. The example shown includes processor unit 400, memory unit 405, training component 410, content management system 415, rule-based content component 420, clustering component 425, custom content component 430, and user interface 435.

A processor unit 400 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 400 is configured to operate a memory array using a memory controller. In other cases, a memory controller is integrated into the processor. In some cases, the processor unit 400 is configured to execute computer-readable instructions stored in a memory to perform various functions. In some embodiments, a processor unit 400 includes special purpose components for modem processing, baseband processing, digital signal processing, or transmission processing.

Examples of a memory unit 405 include random access memory (RAM), read-only memory (ROM), or a hard disk. Examples of memory unit 405 include solid state memory and a hard disk drive. In some examples, a memory unit 405 is used to store computer-readable, computer-executable software including instructions that, when executed, cause a processor to perform various functions described herein. In some cases, the memory unit 405 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 405 store information in the form of a logical state.

According to some embodiments of the present disclosure, the content management apparatus includes a computer implemented artificial neural network (ANN) that clusters a set of content items to obtain a set of content groups. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 410 identifies a pre-determined set of topics. Training component 410 identifies key words from each of the content items. In some examples, training component 410 identifies frequency for each of the key words from a content item. Training component 410 identifies a subset of the set of topics based on the frequency for each of the key words. Training component 410 converts the set of topics to corresponding topic vectors. Training component 410 generates a vector representation of the content item based on the subset of the set of topics and the corresponding topic vectors. In some examples, training component 410 identifies a set of nearest neighbors for the content item based on the vector representation, where the clustering is based on the nearest neighbors.

According to some embodiments, content management system 415 receives the content items from a set of software applications.

According to some embodiments, rule-based content component 420 orders content items based on a selection rule. Rule-based content component 420 selects a rule-based content item based on the ordering. In some examples, rule-based content component 420 determines that the user uses a first software application of the set of software applications, where the rule-based content item is selected based on the determination. In some examples, the selection rule includes a recency rule, a publish date rule, a promotion date range rule, a location rule, or a paid subscription rule. In some examples, rule-based content component 420 identifies a set of selection rules, where the content items are ordered based on the selection rules. In some examples, rule-based content component 420 selects a set of rule-based content items based on the selection rule.

According to some embodiments, the rule-based content component 420 is configured to select a set of rule-based content items based on the selection rule, and the custom content component 430 is configured to select a set of custom content items based on the clustering. Rule-based content component 420 is an example of, or includes aspects of, the corresponding element described with reference to FIG. 5.

According to some embodiments, clustering component 425 clusters the content items using an unsupervised learning algorithm to obtain a set of content groups. In some examples, the unsupervised learning algorithm includes a latent Dirichlet allocation (LDA) clustering algorithm, a latent semantic analysis (LSA) algorithm, a probabilistic latent semantic analysis (PLSA) algorithm, or an Lda2vec algorithm. In some examples, clustering component 425 identifies key words from each of the content items, where the content items are clustered based on the key words. In some examples, clustering component 425 identifies a predetermined set of topics, where the set of content groups correspond to the set of topics. In some examples, clustering component 425 identifies a content group corresponding to the rule-based content item, where the custom content item is selected from the content group.

According to some embodiments, clustering component 425 clusters the content items based on the key words using an unsupervised learning model to obtain a set of content groups corresponding to the pre-determined set of topics. Clustering component 425 is an example of, or includes aspects of, the corresponding element described with reference to FIG. 5.

According to some embodiments, custom content component 430 selects a custom content item related to the rule-based content item based on the content groups. In some examples, custom content component 430 selects a set of custom content items based on the clustering. In some examples, custom content component 430 selects a custom content item having a same topic as the rule-based content item based on the clustering. Custom content component 430 is an example of, or includes aspects of, the corresponding element described with reference to FIG. 5. User interface 435 is an example of, or includes aspects of, the corresponding element described with reference to FIGS. 3 and 5.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 5 shows an example of a content management diagram according to aspects of the present disclosure. The example shown includes rule-based content component 500, clustering component 505, custom content component 510, and user interface 515.

According to an embodiment, the content management system is configured to order content items based on a selection rule, select a rule-based content item based on the ordering, cluster the content items using an unsupervised learning algorithm to obtain a plurality of content groups, select a custom content item related to the rule-based content item based on the content groups, and display the rule-based content item and the custom content item to a user.

From top to bottom as illustrated in FIG. 5, the rule-based content component 500 takes a set of selection rules as input and order the set of content items based on the selection rules. In some examples, the selection rules include latest publish date, promoted date range of content items, paid subscription rule, location of users, etc. Rule-based content component 500 is an example of, or includes aspects of, the corresponding element described with reference to FIG. 4. The content items are then input to clustering component 505, which clusters the content items using an unsupervised learning algorithm to obtain a set of content groups. Clustering component 505 is an example of, or includes aspects of, the corresponding element described with reference to FIG. 4. The set of content groups are then input to custom content component 510, which selects a custom content item related to the rule-based content item based on the content groups. Custom content component 510 is an example of, or includes aspects of, the corresponding element described with reference to FIG. 4. User interface 515 displays the rule-based content item and the custom content item to a user. User interface 515 is an example of, or includes aspects of, the corresponding element described with reference to FIGS. 3 and 4.

Content Management

Figure 6:
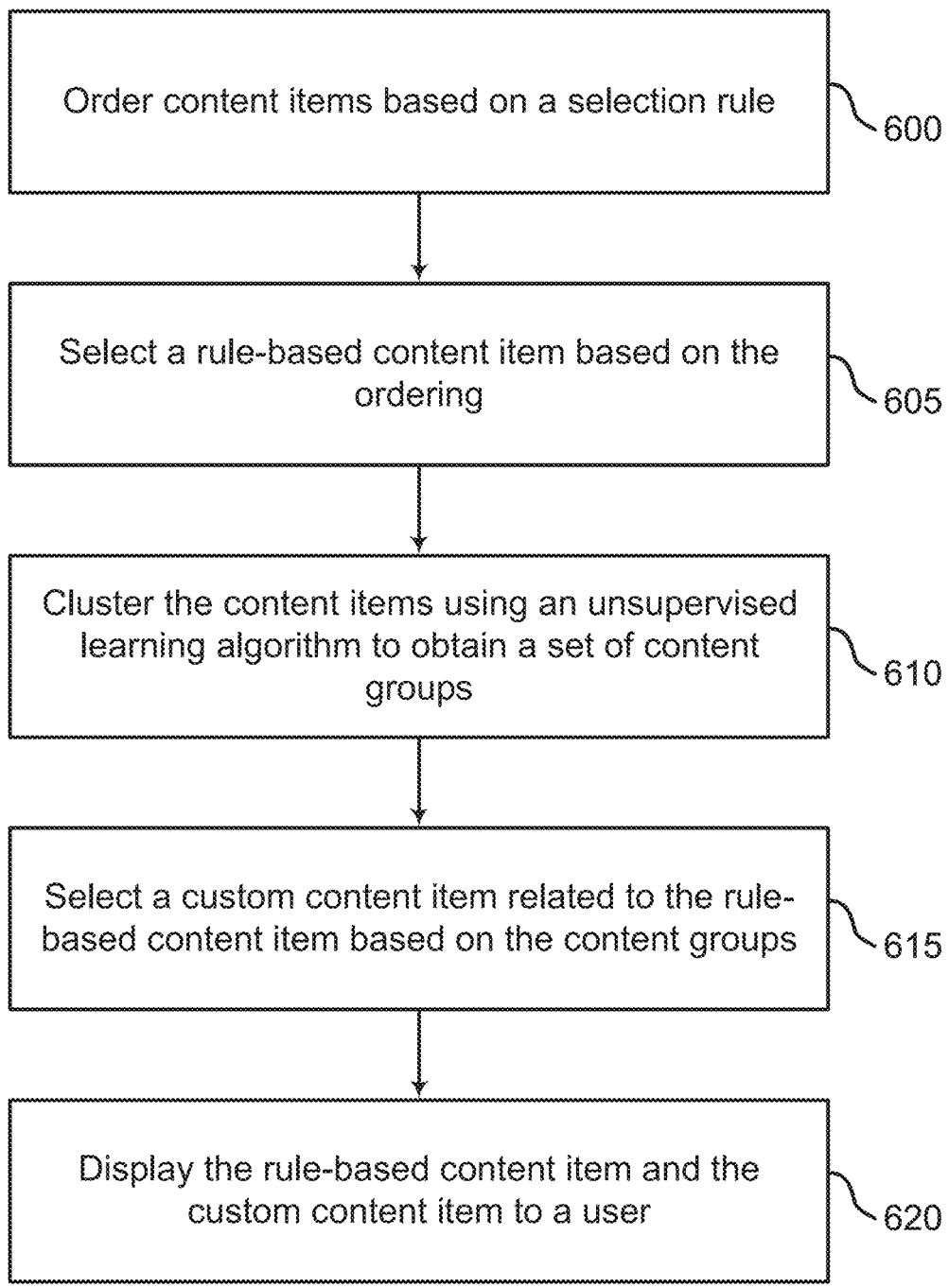
FIG. 6 shows an example of a process for content management according to aspects of the present disclosure.
Figure 7:
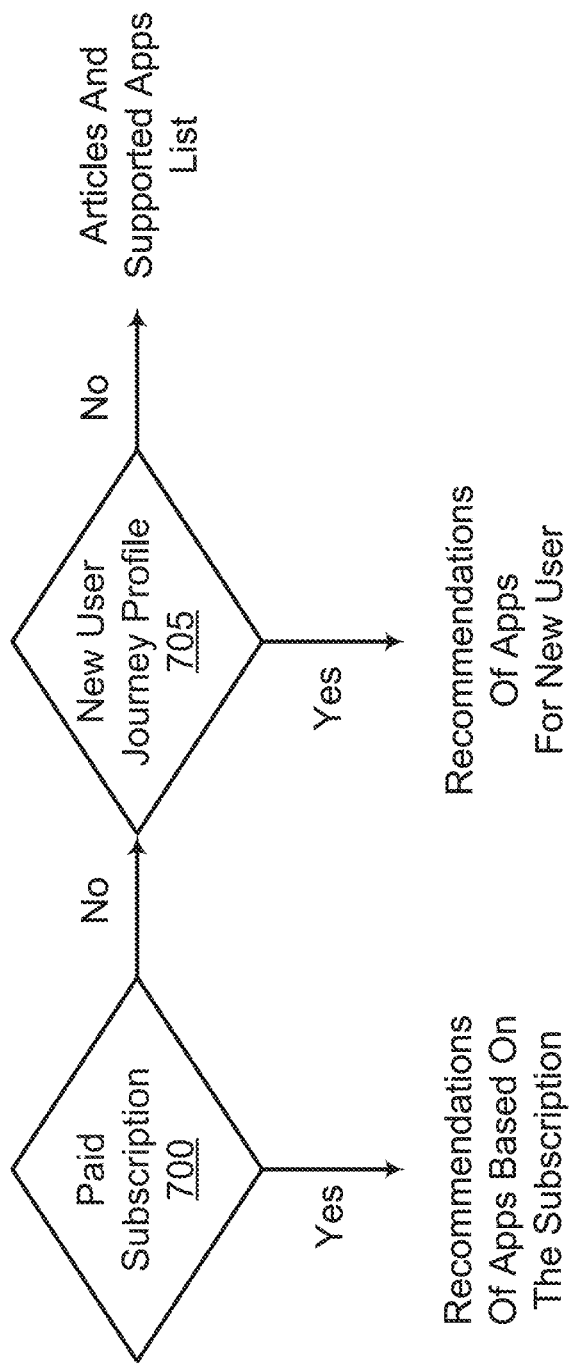
FIG. 7 shows an example of a process for content recommendation based on a paid subscription rule and user profile according to aspects of the present disclosure.
Figure 8:
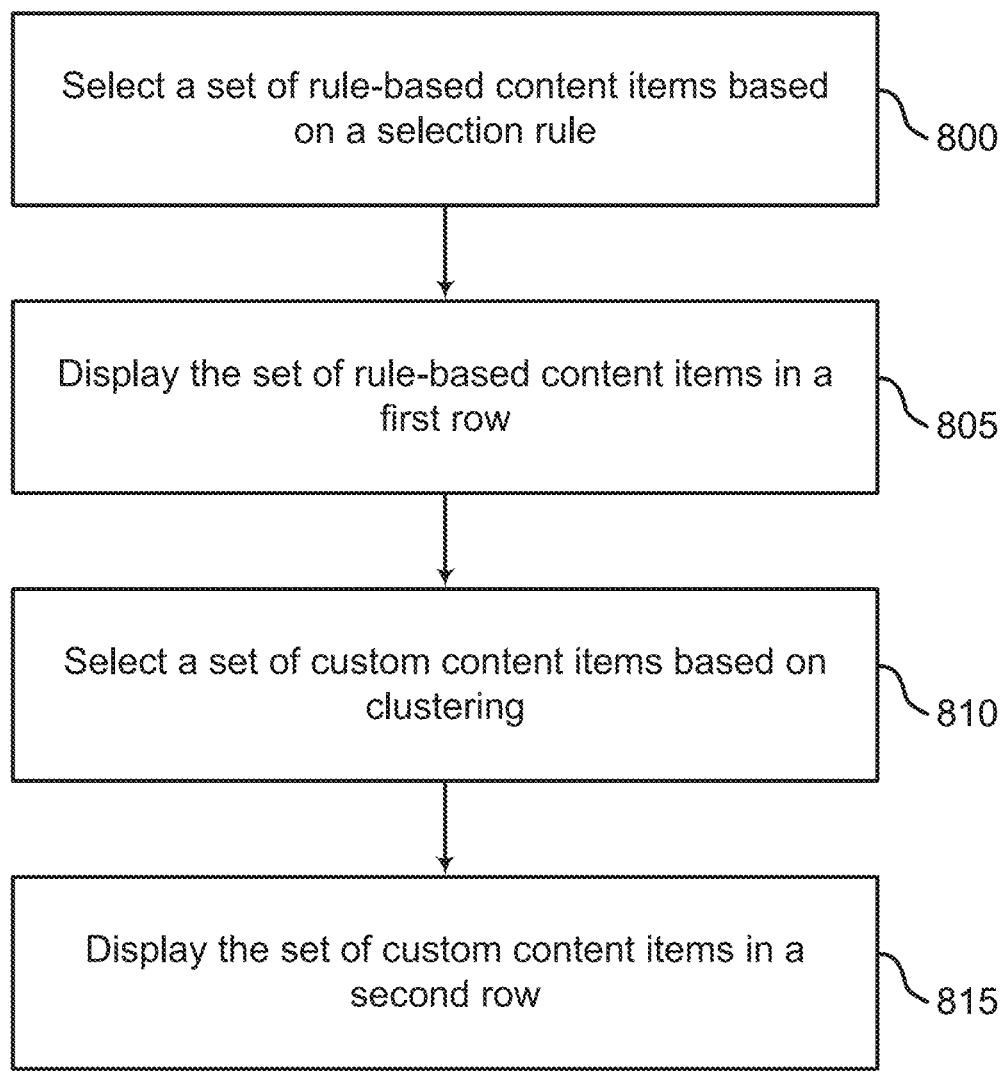
FIG. 8 shows an example of a process for content management displaying at least two rows according to aspects of the present disclosure.

In FIGS. 6-8, a method, apparatus, and non-transitory computer readable medium for content management are described. One or more embodiments of the method, apparatus, and non-transitory computer readable medium include ordering content items based on a selection rule, selecting a rule-based content item based on the ordering, clustering the content items using an unsupervised learning algorithm to obtain a plurality of content groups, selecting a custom content item related to the rule-based content item based on the content groups, and displaying the rule-based content item and the custom content item to a user.

Some examples of the method, apparatus, and non-transitory computer readable medium further include receiving the content items from a plurality of software applications. Some examples further include determining that the user uses a first software application of the plurality of software applications, wherein the rule-based content item is selected based on the determination.

In some examples, the selection rule comprises a recency rule, a publish date rule, a promotion date range rule, a location rule, or a paid subscription rule. Some examples of the method, apparatus, and non-transitory computer readable medium further include identifying a plurality of selection rules, wherein the content items are ordered based on the selection rules.

In some examples, the unsupervised learning algorithm comprises a latent Dirichlet allocation (LDA) clustering algorithm, a latent semantic analysis (LSA) algorithm, a probabilistic latent semantic analysis (PLSA) algorithm, or an Lda2vec algorithm.

Some examples of the method, apparatus, and non-transitory computer readable medium further include identifying key words from each of the content items, wherein the content items are clustered based on the key words.

Some examples of the method, apparatus, and non-transitory computer readable medium further include identifying a pre-determined set of topics, wherein the plurality of content groups correspond to the set of topics.

Some examples of the method, apparatus, and non-transitory computer readable medium further include identifying a content group corresponding to the rule-based content item, wherein the custom content item is selected from the content group.

Some examples of the method, apparatus, and non-transitory computer readable medium further include selecting a plurality of rule-based content items based on the selection rule. Some examples further include displaying the plurality of rule-based content items in a first row. Some examples further include selecting a plurality of custom content items based on the clustering. Some examples further include displaying the plurality of custom content items in a second row.

Some examples of the method, apparatus, and non-transitory computer readable medium further include collecting a history of user interactions with a software application. Some examples further include generating a new user journey profile based on the history of user interactions, wherein the selection rule is based on the new user journey profile.

Some examples of the method, apparatus, and non-transitory computer readable medium further include determining whether the user has a subscription for a software application, wherein the selection rule is based on the determination.

Some examples of the method, apparatus, and non-transitory computer readable medium further include collecting a history of user interactions. Some examples further include performing predictive analysis based on the history of user interactions to identify a software application for the user, wherein the selection rule is based on the software application.

FIG. 6 shows an example of a process for content management according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system orders content items based on a selection rule. In some cases, the operations of this step refer to, or may be performed by, a rule-based content component as described with reference to FIGS. 4 and 5.

At operation 605, the system selects a rule-based content item based on the ordering. In some cases, the operations of this step refer to, or may be performed by, a rule-based content component as described with reference to FIGS. 4 and 5.

In some examples, the article recommendations for the user are based on a set of selection rules (e.g., versions of rules). A first version is the latest publish date and a second version is the promoted date range (e.g., promoted date range of a set of articles). For example, a user may select the first version in Adobe® Illustrator and may be provided article recommendations based on latest publish date. Similarly, if a user selects the promoted date range rule, ordering of the articles occurs within the software application and the user is recommended articles according to the second version of the selection rules. Therefore, with change of selection rules, the content management system (via its application) can control recommendations displayed to users.

In some examples, a third version of the rules includes location of users. As a result, the set of rules may be based on location, followed by the promoted date range and then the newest publish date. For example, if a user is located in the United States (US), the content management system searches through metadata of the articles and recommends articles marked with appropriate language/locale (e.g., en-US, "en" denotes English). Similarly, a German user may click on a German article in the application. The content management system recommends German articles, followed by articles based on promoted date range and the newest publish date.

At operation 610, the system clusters the content items using an unsupervised learning algorithm to obtain a set of content groups. In some cases, the operations of this step refer to, or may be performed by, a clustering component as described with reference to FIGS. 4 and 5.

In some embodiments, the content management system applies an unsupervised learning algorithm (e.g., latent Dirichlet allocation or LDA, KBTree) to generate additional datasets. For example, a sample set may include more than 1000 articles. An unsupervised learning algorithm scans the content of different articles and provides a score on a 2D surface. Articles that are similar are grouped by topic. For example, different colors on the 2D surface may illustrate groups of films, videos, photos, illustrations, etc. Therefore, if an article is picked from the use case which is in one of the groups, the content management system can select and suggest additional articles (e.g., display articles in a second row, see FIG. 8) which are closest to the use-case article. Additionally, the selected articles may be tuned, i.e., the content management system may select one article for one user and randomize recommendations for another user.

At operation 615, the system selects a custom content item related to the rule-based content item based on the content groups. In some cases, the operations of this step refer to, or may be performed by, a custom content component as described with reference to FIGS. 4 and 5.

At operation 620, the system displays the rule-based content item and the custom content item to a user. In some cases, the operations of this step refer to, or may be performed by, a user interface as described with reference to FIGS. 3 to 5.

According to an embodiment, the user interface displays a set of rule-based content items in a first row. The user interface displays a set of custom content items in a second row. However, embodiments of the present disclosure are not limited to two rows.

FIG. 7 shows an example of a process for content recommendation based on a paid subscription rule and user profile according to aspects of the present disclosure. The example shown includes paid subscription 700 and new user journey profile 705.

According to an embodiment, the content management system is configured to mix a set of rules with other services input collected for the user to make the system more engaging. The content management system identifies software applications bought or subscribed by the user. In the case of paid subscription 700 (i.e., "Yes"), the recommendations to the user are based on the subscription status. Alternatively, if the user is not a paid customer (i.e., "No"), the content management system applies the new user journey (NUJ) profile, for example, questionnaire or user responses collected from the Adobe® CC Desktop application. A list of recommendations is derived for a new user based on the NUJ profile. For example, a user may answer questions in Adobe® InDesign or Photoshop and the information obtained may be used for development of rules.

FIG. 8 shows an example of a process for content management displaying at least two rows according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system selects a set of rule-based content items based on a selection rule. In some cases, the operations of this step refer to, or may be performed by, a rule-based content component as described with reference to FIGS. 4 and 5.

According to some embodiments, the system can automatically incorporate multiple inputs from multiple surfaces or services. The content management system applies both selection rules and machine learning to recommend diverse content to users across multiple surfaces. In some cases, machine learning models generate content that is not seen or selected by the users previously. For example, a mixed use of rules may show content from Adobe® MAX conference in a certain time-period or show popular summer content, etc.

In some cases, the article recommendations for the user are based on selection rules. For example, the selection rules include the latest publish date and the promoted date range of the articles. For example, a user may choose to select an article or a tutorial according to the latest publish date in Adobe® Illustrator and may be provided article recommendations based on latest publish date. Similarly, if a user selects the promoted date range rule, ordering of the articles occurs within the software application and the user is recommended articles according to the promoted date range rules. Therefore, with change of rules, the content management system can control recommendations displayed to users.

An additional selection rule includes location of users. As a result, the set of rules may be based on location, followed by the promoted date range and then the newest publish date. For example, if a user is in the US, the software scans the metadata of the articles and recommends articles marked with appropriate locale (e.g., en-US). Similarly, a German user may click on a German article in the application. Therefore, the content management system recommends German articles, followed by articles based on promoted date range and the newest publish date.

At operation 805, the system displays the set of rule-based content items in a first row. In some cases, the operations of this step refer to, or may be performed by, a user interface as described with reference to FIGS. 3 to 5.

At operation 810, the system selects a set of custom content items based on clustering. In some cases, the operations of this step refer to, or may be performed by, a custom content component as described with reference to FIGS. 4 and 5.

According to an embodiment, the content management system includes a content selection and recommendation model that enables a mix of automated rules. The rules include input from multiple surfaces, behaviors, and machine learning generated content. As a result, a customized machine generated diversity of content is recommended to users (i.e., increase user engagement). The system includes an unsupervised learning model for topic modeling based on text of an article. In some examples, the unsupervised learning algorithm includes LDA clustering algorithm. Detail regarding the LDA clustering algorithm will be described in FIGS. 10-12.

At operation 815, the system displays the set of custom content items in a second row. In some cases, the operations of this step refer to, or may be performed by, a user interface as described with reference to FIGS. 3 to 5.

According to some embodiments, the content management system may be used to generate content by combining rule-based methods and machine learning. In some examples, content is generated in Adobe® CC Home and transferred to other services or support systems. When an existing Adobe® user first signs up on Discover at Home, the content management system (via its application) recommends a number of different boxes of action or content the user can browse or read (e.g., eight boxes).

Training and Evaluation

In FIGS. 9-12, a method, apparatus, and non-transitory computer readable medium for training an unsupervised model are described. One or more embodiments of the method, apparatus, and non-transitory computer readable medium include ordering content items based on a selection rule, selecting a rule-based content item based on the ordering, identifying a pre-determined set of topics, identifying key words from each of the content items, clustering the content items based on the key words using an unsupervised learning model to obtain a plurality of content groups corresponding to the pre-determined set of topics, and selecting a custom content item having a same topic as the rule-based content item based on the clustering.

Some examples of the method, apparatus, and non-transitory computer readable medium further include identifying frequency for each of the key words from a content item. Some examples further include identifying a subset of the set of topics based on the frequency for each of the key words. Some examples further include converting the set of topics to corresponding topic vectors. Some examples further include generating a vector representation of the content item based on the subset of the set of topics and the corresponding topic vectors. Some examples further include identifying a plurality of nearest neighbors for the content item based on the vector representation, wherein the clustering is based on the nearest neighbors.

Figure 9:
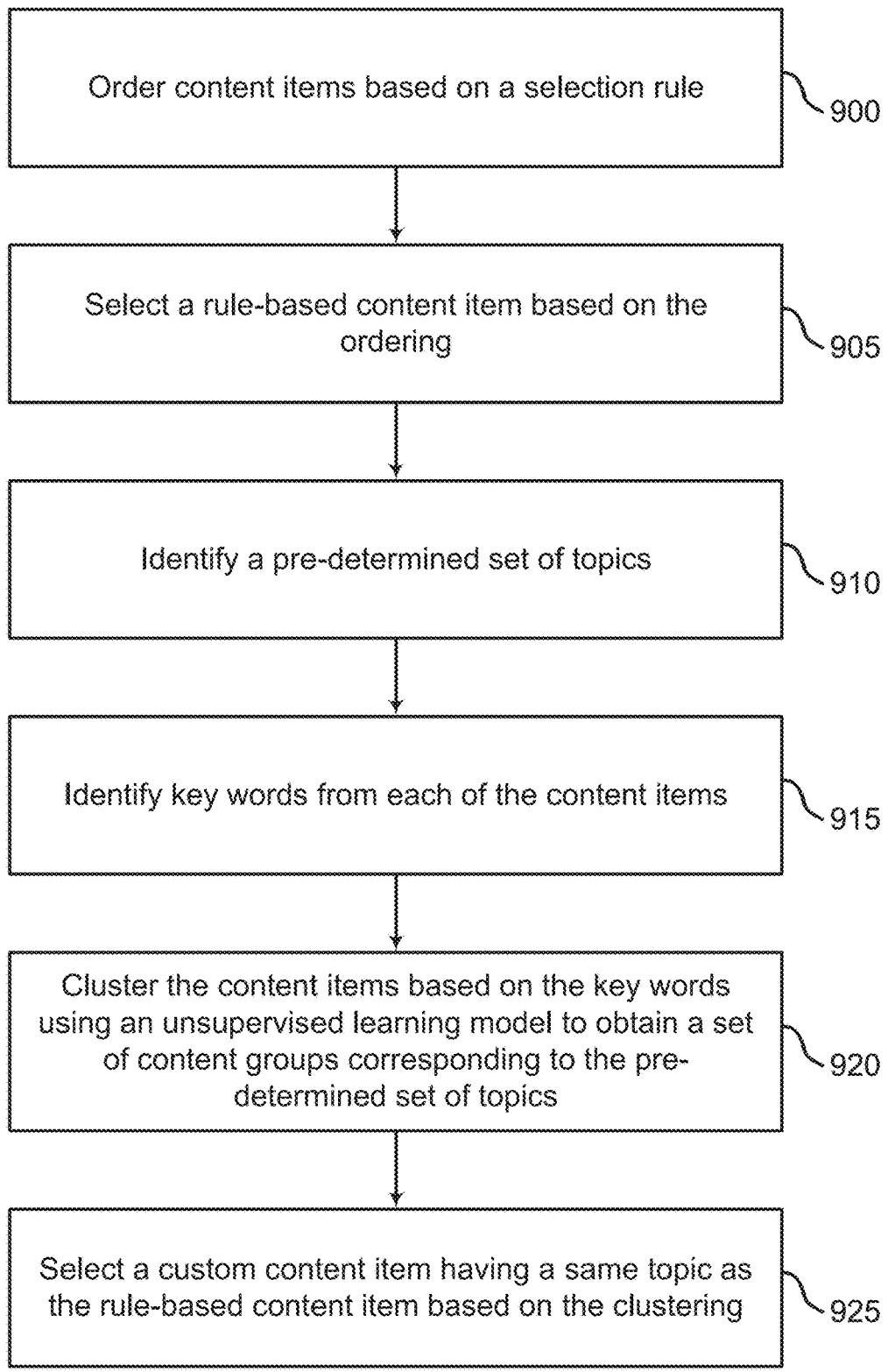
FIG. 9 shows an example of a process for training an unsupervised model according to aspects of the present disclosure.

FIG. 9 shows an example of a process for training an unsupervised model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use unsupervised learning methods. Unsupervised learning is one of three basic machine learning paradigms, alongside supervised learning and reinforcement learning. Unsupervised learning draws inferences from datasets consisting of input data without labeled responses. Unsupervised learning may be used to find hidden patterns or grouping in data. For example, cluster analysis is a form of unsupervised learning. Clusters may be identified using measures of similarity such as Euclidean or probabilistic distance.

According to some embodiments, an unsupervised learning algorithm includes latent semantic analysis (LSA). LSA is a natural language processing (NLP) technique for analyzing relationships between documents and the terms within the documents. For example, an LSA-based system may be based on the assumption that words that are close in meaning will occur close to each other, or in similar documents (i.e., documents containing similar sets of terms). In some cases, matrices containing word counts may be generated from the documents. The matrices may then be processed using singular value decomposition (SVD) to reduce the number of matrix rows while preserving structure among columns. The documents may then be compared by taking the cosine of the angle between the two vectors (or the dot product between the normalizations of the two vectors) formed by any two columns Values close to 1 represent similar documents and values close to 0 represent documents with little similarity.

At operation 900, the system orders content items based on a selection rule. In some cases, the operations of this step refer to, or may be performed by, a rule-based content component as described with reference to FIGS. 4 and 5. The selection rule includes latest publish date, promoted date range of content items, user location, etc.

One or more embodiments of the present disclosure include metadata for each content item (e.g., articles) which is associated with an application. For example, metadata is based on content that is emphasized in the articles and is associated with Adobe® Photoshop or Illustrator. As a result, selection rules are used for some of the recommendations (e.g., rule-based items are displayed in a first section). In some examples, these recommendations are based on the applications liked by a user and the NUJ profile associated with the user. The content management system can be applied to mobile applications.

At operation 905, the system selects a rule-based content item based on the ordering. In some cases, the operations of this step refer to, or may be performed by, a rule-based content component as described with reference to FIGS. 4 and 5.

At operation 910, the system identifies a pre-determined set of topics. In some cases, the operations of this step refer to, or may be performed by, a training component as described with reference to FIG. 4. According to an embodiment, a topic may be described as a probability distribution of words. A topic model (e.g., latent Dirichlet allocation or LDA) may be used to discover underlying topics in a document or a collection of documents and infer word probabilities in topics.

At operation 915, the system identifies key words from each of the content items. In some cases, the operations of this step refer to, or may be performed by, a training component as described with reference to FIG. 4.

At operation 920, the system clusters the content items based on the key words using an unsupervised learning model to obtain a set of content groups corresponding to the pre-determined set of topics. In some cases, the operations of this step refer to, or may be performed by, a clustering component as described with reference to FIGS. 4 and 5.

At operation 925, the system selects a custom content item having a same topic as the rule-based content item based on the clustering. In some cases, the operations of this step refer to, or may be performed by, a custom content component as described with reference to FIGS. 4 and 5. The custom content item and the rule-based content item are both recommended to a user. The rule-based content item is displayed in a first section of a user interface or a website page while the custom content item is displayed in a second section.

Figure 10:
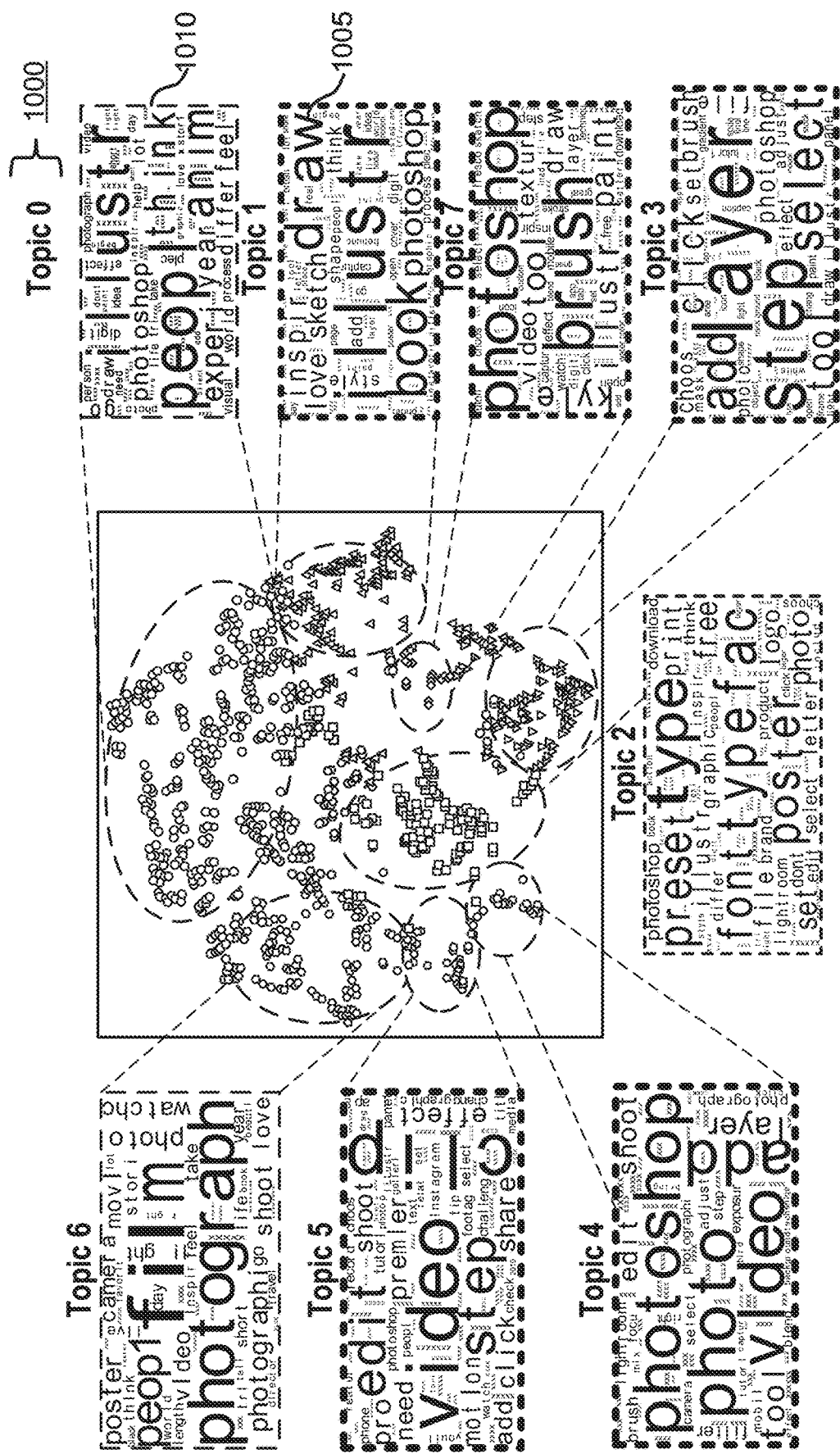
FIG. 10 shows an example of a process for content management using clustering according to aspects of the present disclosure.

FIG. 10 shows an example of a process for content management using clustering according to aspects of the present disclosure. The example shown includes topic 1000, key words 1005, and content group 1010.

The content management system can recommend new related articles to a user. For example, multiple article recommendations may be delivered to a user who reads a specific article on Adobe® Creative Cloud ("CC") Home Discover. In an embodiment, a machine learning model is trained to select multiple article recommendations based on feedback from users and project management systems.

According to an embodiment, the content management system includes an unsupervised learning model for topic modeling based on text of an article (i.e., exclude user click data). In some cases, a topic may be described as a probability distribution of words. A topic model (e.g., LDA) may be used to discover underlying topics in a document or a collection of documents and infer word probabilities in topics. For example, a machine learning model is trained on multiple (more than 1000) articles (e.g., creative content) and the network model can identify topics (e.g., 8 topics) to group the set of articles. Each article is colored according to the main topic. In some examples, the network model is an unsupervised learning model.

As the example illustrated in FIG. 10, the network model identifies a pre-determined set of topics (e.g., 8 topics) and a set of content groups 1010 correspond to the set of topics. Content group 1010 is an example of, or includes aspects of, the corresponding element described with reference to FIG. 11. Key words 1005 include the phrase/word "draw" for topic 1.

Figure 11:
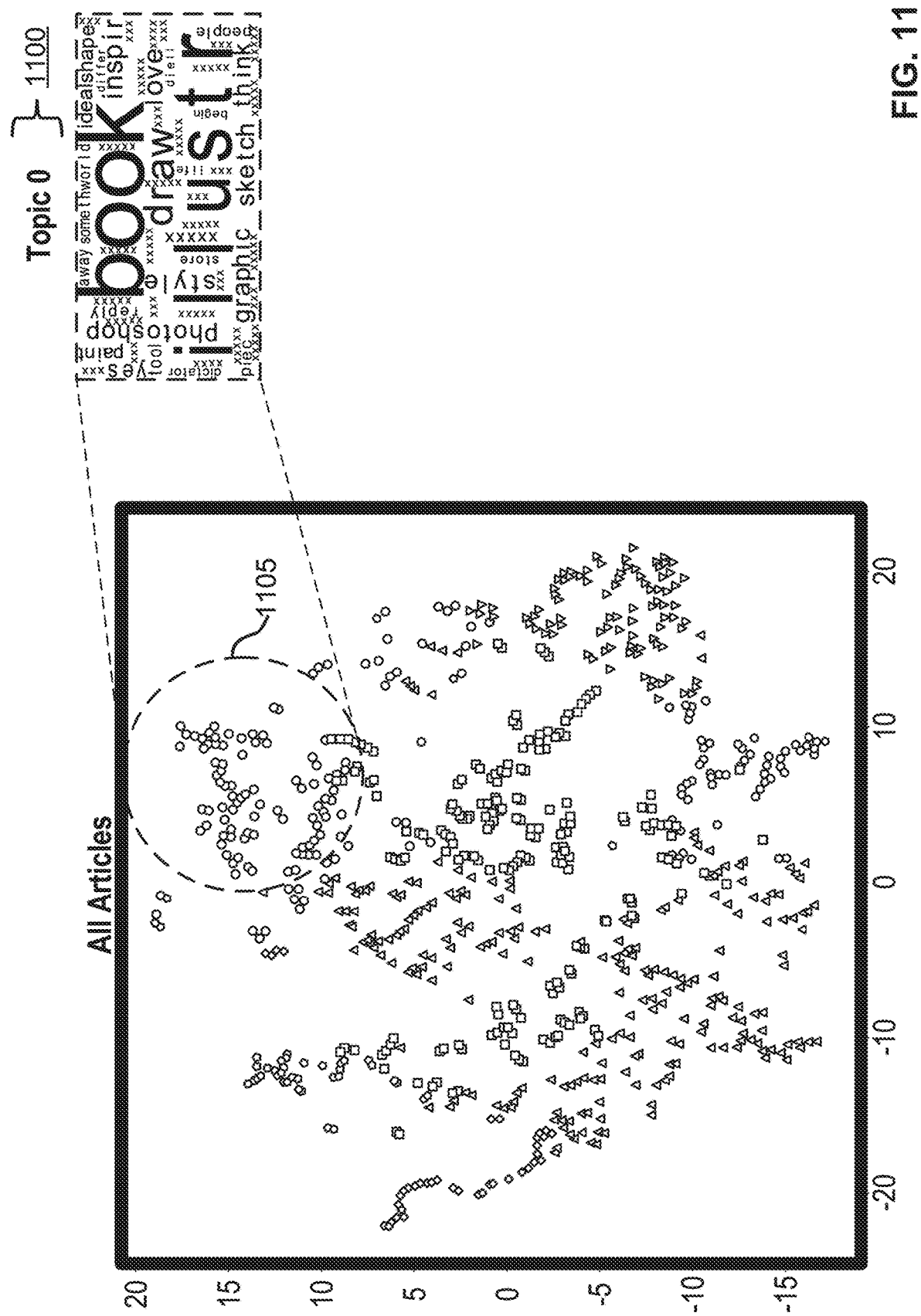
FIG. 11 shows an example of content clustering according to aspects of the present disclosure.

FIG. 11 shows an example of content clustering according to aspects of the present disclosure. The example shown includes topic 1100 and content group 1105. Content group 1105 is an example of, or includes aspects of, the corresponding element described with reference to FIG. 10.

In an example, an article includes the following text. "Keith Haring|Create. Keith Haring believed art is for everybody. We do too. Draw and paint with free brushes inspired by this iconic artist. Enter our contest and create art for positive change. Learn about the contest. Tools Assets Keith Haring brushes Libraries let you share, reuse, and manage assets. Learn more. Pick up a brush and draw for good. This artist took art beyond museum walls and into the streets, subway stations, and other public spaces. We're celebrating his legacy with a collection of digital brushes inspired by his original tools—chalk, markers, spray paint, and more. They're free to everyone in Adobe Fresco and available in Photoshop. Download the brushes and spread his message of love, hope, and equality. Chalk Keith drew his famous New York City subway art with chalk on black wall panels. This set includes round and square chalk, as well as a brush that emulates the look of chalk on cardboard. Markers Keith used permanent markers for some of his pieces because they could draw on practically any surface, including metal. Our set includes chisel, square, and brush markers that you can adjust for a full ink or dried-out effect. Sumi Ink He cut the bristles of Sumi brushes to make his own flat-tipped tools. Our brushes let you control the tilt and pressure to get."

According to some embodiments, the network model groups related words in one topic. In the example text above, some words (i.e., draw, paint, brush) comprise 48% of topic words and may be grouped under one topic (e.g., topic 7 in FIG. 10). Similarly, other words (i.e., free, inspired, download, include) are grouped in another topic and include 35% of the topic words (e.g., topic 2 in FIG. 10). In some examples, the network model identifies articles with similar words as related and the articles are described as a combination of topics.

Figure 12:
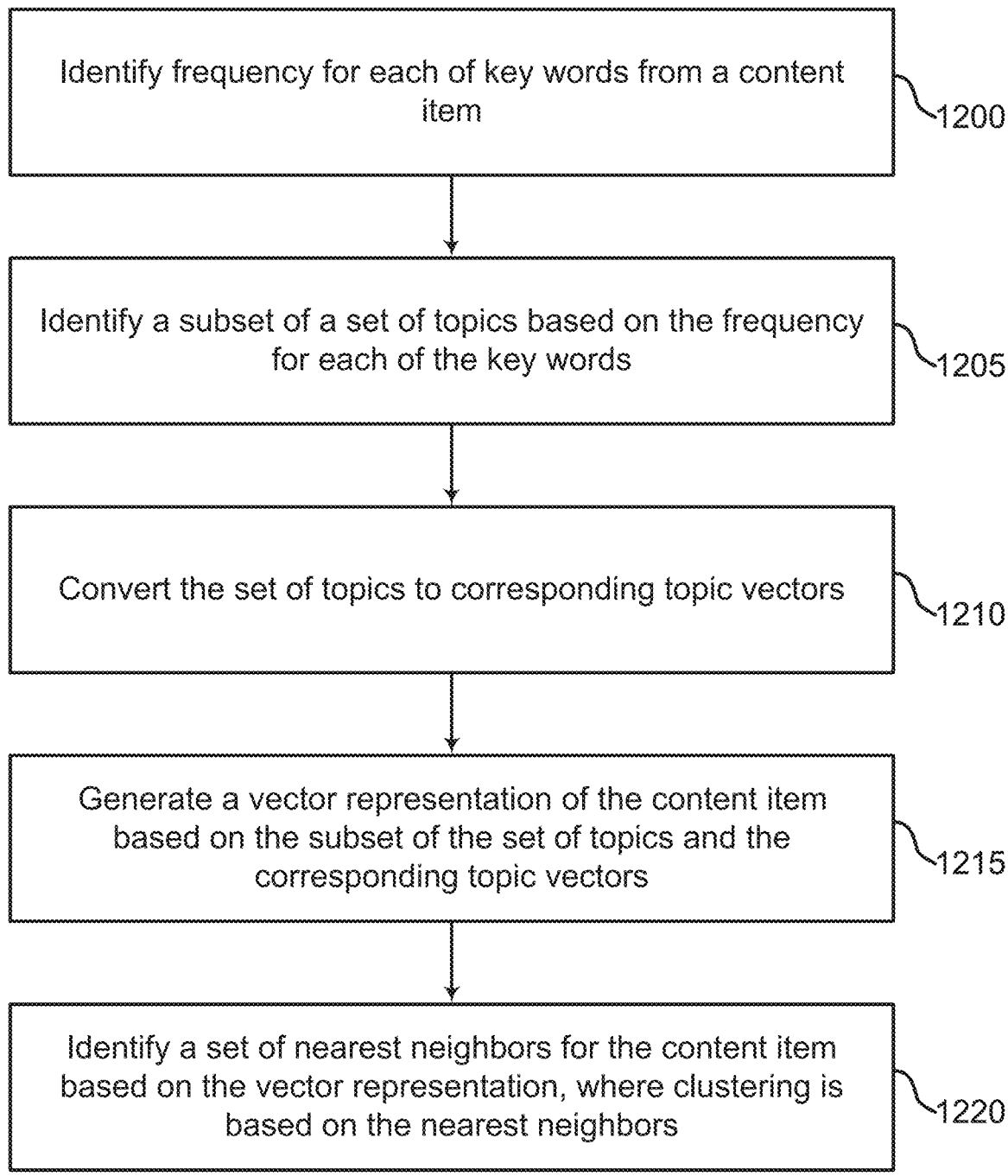
FIG. 12 shows an example of a process for training an unsupervised model according to aspects of the present disclosure.

FIG. 12 shows an example of a process for training an unsupervised model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1200, the system identifies frequency for each of key words from a content item. In some cases, the operations of this step refer to, or may be performed by, a training component as described with reference to FIG. 4.

At operation 1205, the system identifies a subset of a set of topics based on the frequency for each of the key words. In some cases, the operations of this step refer to, or may be performed by, a training component as described with reference to FIG. 4.

According to some embodiments of the present disclosure, the content management system includes an unsupervised model for topic modeling using latent Dirichlet allocation (LDA). In some cases, the network model captures and processes text of one or more articles. Processing article text includes evaluating the frequency of each word. For example, a text may include words such as "festival", "impossible", "create" with frequencies of 10, 5 and 3 respectively. Next, the network model may choose the number of topics to describe articles (e.g., 8 topics).

At operation 1210, the system converts the set of topics to corresponding topic vectors. In some cases, the operations of this step refer to, or may be performed by, a training component as described with reference to FIG. 4.

In an embodiment, the LDA model describes articles as vectors of the topics. The topic vectors are used to find the nearest neighbors with maximum overlap. The associated articles are then recommended to the users.

At operation 1215, the system generates a vector representation of the content item based on the subset of the set of topics and the corresponding topic vectors. In some cases, the operations of this step refer to, or may be performed by, a training component as described with reference to FIG. 4.

At operation 1220, the system identifies a set of nearest neighbors for the content item based on the vector representation, where clustering is based on the nearest neighbors. In some cases, the operations of this step refer to, or may be performed by, a training component as described with reference to FIG. 4.

Performance of apparatus, systems and methods of the present disclosure have been evaluated, and results indicate embodiments of the present disclosure have obtained increased performance over existing technology. Example experiments demonstrate that the content management system outperforms conventional systems and increases user engagement with creative content.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for displaying content on a website, comprising:
   obtaining a plurality of content items for the website and a user interaction history for a software service, wherein a subset of the plurality of content items corresponds to the software service;
   identifying a selection rule based on the user interaction history;
   ordering the subset of the plurality of content items based on the selection rule;
   selecting a rule-based content item based on the ordering;
   clustering the plurality of content items using an unsupervised machine learning algorithm to obtain a plurality of content groups based on content of the plurality of content items;
   selecting a custom content item from the plurality of content items other than the subset of the plurality of content items corresponding to the software service based on the content groups, wherein the custom content item has a same topic as the rule-based content item and corresponds to a different software service; and
   arranging the rule-based content item in a first region of the website corresponding to the software service and the custom content item in a second region of the website corresponding to the same topic as the rule-based content item.

2. The method of claim 1, further comprising:
   receiving the content items from a plurality of software applications; and
   determining that a user uses a first software application of the plurality of software applications, wherein the rule-based content item is selected based on the determination.

3. The method of claim 1, wherein:
   the selection rule comprises a recency rule, a publish date rule, a promotion date range rule, a location rule, or a paid subscription rule.

4. The method of claim 1, wherein the custom content item comprises diverse content corresponding to the different software service with respect to the rule-based content item.

5. The method of claim 1, wherein:
   the unsupervised machine learning algorithm comprises a latent Dirichlet allocation (LDA) clustering algorithm, a latent semantic analysis (LSA) algorithm, a probabilistic latent semantic analysis (PLSA) algorithm, or an Lda2vec algorithm.

6. The method of claim 1, further comprising:
   identifying key words from each of the content items, wherein the content items are clustered based on the key words.

7. The method of claim 1, further comprising:
   identifying a pre-determined set of topics, wherein the plurality of content groups correspond to the set of topics.

8. The method of claim 1, further comprising:
   identifying a content group corresponding to the rule-based content item, wherein the custom content item is selected from the content group.

9. The method of claim 1, further comprising:
   selecting a plurality of rule-based content items based on the selection rule;
   displaying the plurality of rule-based content items in the first region;
   selecting a plurality of custom content items based on the clustering; and
   displaying the plurality of custom content items in the second region.

10. The method of claim 1, further comprising:
    generating a new user journey profile based on the user interaction history, wherein the selection rule is based on the new user journey profile.

11. The method of claim 1, further comprising:
    determining whether a user has a subscription for a software application, wherein the selection rule is based on the determination.

12. The method of claim 1, further comprising:
    performing predictive analysis based on the user interaction history to identify the software service for a user, wherein the selection rule is based on the software service.

13. A method for training an unsupervised model for displaying content on a website, comprising:
    obtaining a plurality of content items for the website and a user interaction history for a software service, wherein a subset of the plurality of content items corresponds to the software service;
    identifying a selection rule based on the user interaction history;
    ordering the subset of the plurality of content items based on the selection rule;
    selecting a rule-based content item based on the ordering;
    identifying a pre-determined set of topics;
    identifying key words from each of the content items;
    clustering the plurality of content items based on the key words using a machine learning model to obtain a plurality of content groups corresponding to the pre-determined set of topics based on content of the plurality of content items;
    selecting a custom content item from the plurality of content items other than the subset of the plurality of content items corresponding to the software service based on the clustering, wherein the custom content item has a same topic as the rule-based content item and corresponds to a different software service; and
    arranging the rule-based content item in a first region of the website corresponding to the software service and the custom content item in a second region of the website corresponding to the same topic as the rule-based content item.

14. The method of claim 13, further comprising:
    identifying frequency for each of the key words from a content item;
    identifying a subset of the set of topics based on the frequency for each of the key words;

converting the set of topics to corresponding topic vectors;

generating a vector representation of the content item based on the subset of the set of topics and the corresponding topic vectors; and identifying a plurality of nearest neighbors for the content item based on the vector representation, wherein the clustering is based on the nearest neighbors.

15. An apparatus for displaying content on a website, comprising:

at least one processor; and at least one memory including instructions executable by the at least one processor to:

obtain a plurality of content items for the website and a user interaction history for a software service, wherein a subset of the plurality of content items corresponds to the software service, identify a selection rule based on the user interaction history;

order the subset of the plurality of content items based on the selection rule;

select a rule-based content item based on the ordering;

cluster the plurality of content items using an unsupervised machine learning algorithm to obtain a plurality of content groups based on content of the plurality of content items;

select a custom content item from the plurality of content items other than the subset of the plurality of content items corresponding to the software service based on the plurality of content groups, wherein the custom content item has a same topic as the rule-based content item and corresponds to a different software service; and arrange the rule-based content item in a first region of the website corresponding to the software service and the custom content item in a second region of the website corresponding to the same topic as the rule-based content item.

16. The apparatus of claim 15, further comprising instructions executable by the at least one processor to:

identify a plurality of selection rules, wherein the content items are ordered based on the selection rules.

17. The apparatus of claim 15, further comprising instructions executable by the at least one processor to:

identify key words from each of the content items, wherein the content items are clustered based on the key words, and identify a pre-determined set of topics, wherein the plurality of content groups correspond to the set of topics.

18. The apparatus of claim 15, further comprising instructions executable by the at least one processor to:

identify a content group corresponding to the rule-based content item, wherein the custom content item is selected from the content group.

19. The apparatus of claim 15, further comprising instructions executable by the at least one processor to:

select a plurality of rule-based content items based on the selection rule, and select a plurality of custom content items based on the clustering.

20. The apparatus of claim 19, further comprising instructions executable by the at least one processor to:

display the plurality of rule-based content items in the first region, and display the plurality of custom content items in the second region.

* * * * *